UNITED STATES PATENT OFFICE.

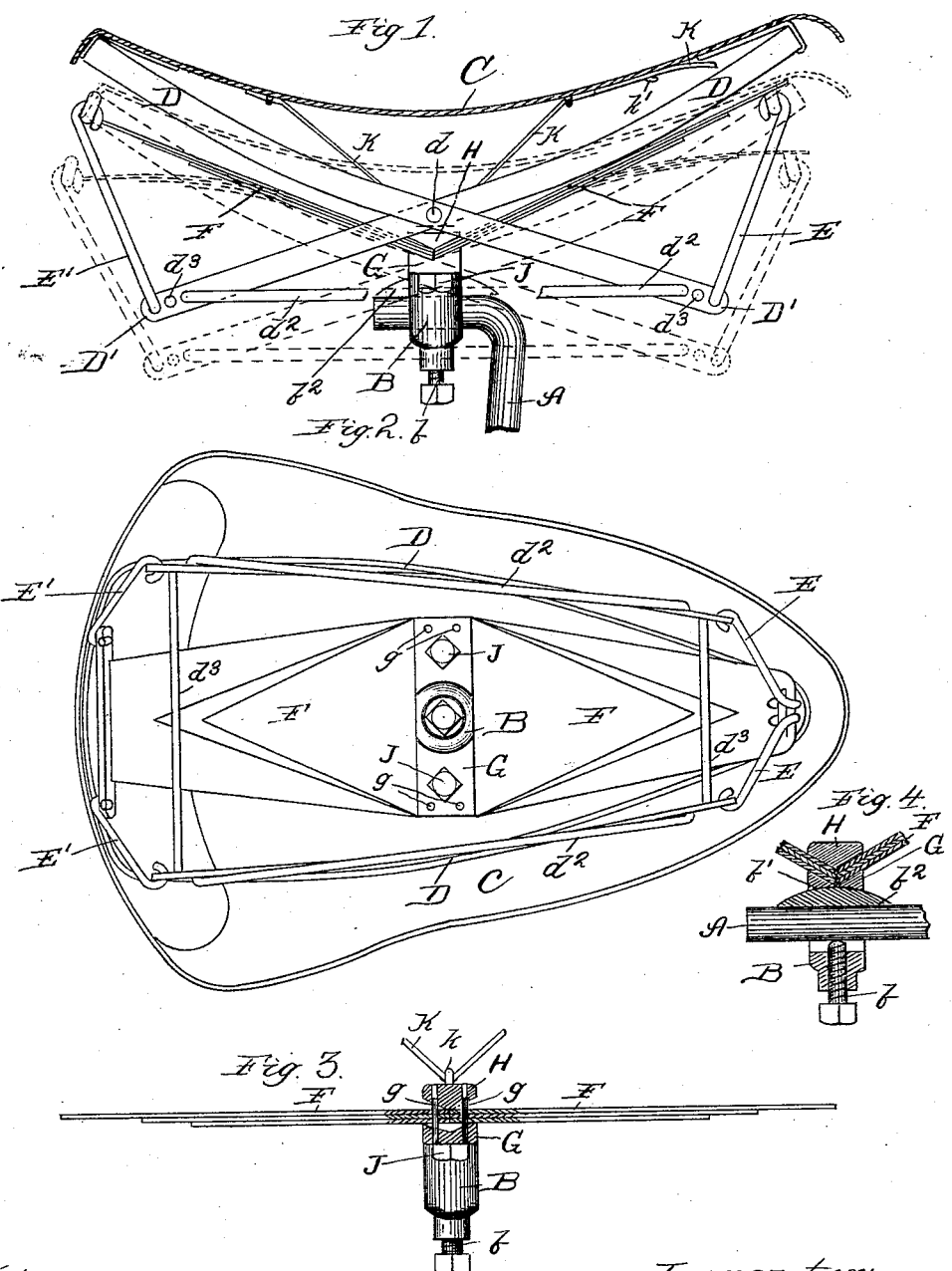

JOHN ANDREW STENBERG, OF LAVERGNE, ILLINOIS.

BICYCLE-SADDLE.

SPECIFICATION forming part of Letters Patent No. 487,789, dated December 13, 1892.

Application filed December 7, 1891. Serial No. 414,269. (No model.)

*To all whom it may concern:*

Be it known that I, JOHN ANDREW STENBERG, a citizen of the United States, residing at Lavergne, in the county of Cook and State of Illinois, have invented a new and useful Improvement in Bicycle-Saddles, of which the following is a specification.

The present invention is a spring-saddle for bicycles, wherein a spring is employed to sustain the saddle, and wherein the saddle is connected to the spring in such manner that it oscillates forward and backward freely and also rocks sidewise, and thus relieves the rider from the shocks incident to the machine riding over obstructions in its path, and accommodates itself to the changes in position of the rider in operating the pedals. It will be found that the disturbances or jolting caused by the passage of the wheels of a bicycle over an obstacle lying in its path is by no means wholly a vertical motion. On the contrary, when the front wheel passes over the obstacle the machine is tilted upon the rear wheel as a pivotal point, which tends to throw the saddle up and backward in a curved path, and when the rear wheel passes over an obstacle the saddle is thrown in a reversed curved path, moving each time upon the front or rear wheel as a pivotal point. Consequently the jolting or saddle motion is one compounded of both a horizontal and vertical movement and the tendency is to throw the rider backward and forward as well as up and down. A spring placed under the saddle will of course cushion the seat against vertical shocks; but I have found that in practice the forward and backward vibration is quite as distressing to the rider, if not more so, than the up-and-down vibration.

It is one of the principal objects of the present invention to provide against the forward and backward vibration of the saddle, and this I accomplish by swinging the saddle and to the spring by long links, so that the saddle, consequently the rider who sits upon it and holds it down by his weight, is relieved of the forward and backward movement incident to the swinging of the machine when passing over obstacles. By thus swinging the saddle-seat, so that it is free to move forward and backward upon its support, the inertia of the rider by keeping him steadily in the plane of motion relieves him of the forward and backward movement. In other words, the machine passes over obstacles and tilts the seat-support backward and forward under the saddle without imparting this motion to the saddle or rider by reason of the inertia of the latter. The links mentioned converge toward each other at their lower ends, where they are joined to the saddle-frame, so that the motion given the saddle is one in which there is compounded with the back and forward vibration a sort of dipping or dropping by the ends of the saddle alternately, the forward end dropping when the forward wheel passes over the obstruction and the rear end dropping when the rear wheel passes over it. The pair of links at each end of the saddle are also brought together at their upper ends, where they join the spring, so that the saddle may rock or teter and accommodate itself measurably to the changes in position assumed by the rider in working the pedals.

The invention consists in its broadest aspect in a saddle so supported that the bicycle may have a swinging motion beneath it backward and forward and up and down, and so that the saddle may also teter or rock sidewise, for the purpose set forth.

The invention also consists in the particular means employed for swinging the saddle by framework to the supporting-springs by intervening links; also in the improved form of spring and its method of adjustment to suit various weights, and also in sundry minor features hereinafter more particularly enumerated.

In the accompanying drawings, Figure 1 is a side elevation of my improved saddle, the dotted lines in said figure indicating the position of the parts when the saddle is depressed by the weight of the rider. Fig. 2 is a view of the saddle from beneath. Fig. 3 is a view of the spring and its adjusting-blocks, shown partly in section. Fig. 4 is a similar sectional view showing the spring adjusted to its greatest degree of stiffness and also showing the mode of attaching and adjusting the saddle to the machine.

Like letters of reference indicate like parts throughout all the figures.

In the drawings, A represents the ordinary saddle-post of a bicycle, to which the saddle is secured.

B is the perforated saddle-shank, provided with the set-screw $b$.

For the purpose of making the saddle adjustable in order that it may be tipped forward or backward to suit the requirements of different riders I make the hole through the saddle-shank with a concave upper portion $b'$ and provide a convex block $b^2$, which is interposed between the upper portion of the saddle-post and the shank. Upon this convex block the shank may be swung to the required extent to tip it forward or backward to suit different riders and be secured in the required position by the set-screw $b$.

C is the usual leather saddle-seat. It is attached to a rigid framework composed of the bars D D, which in the construction illustrated cross each other at the rivet $d$ at each side of the saddle. At each side of the saddle the projecting ends D' are connected together by rods $d^2$. This makes a strong light framework which holds the saddle-seat at a considerable distance above the shank B, and at the same time projects far enough backward, forward, and downward to afford room for the interposition between the spring and said framework of the swinging links E E' at the front and rear of the saddle.

The spring which I prefer to employ in my improved saddle is one composed of flat leaves F, secured to the upper portion of the saddle-shank. These leaves are made in two parts or pieces—a front piece and a rear piece—and the spring as a whole may consist of any desired number of leaves, owing to the stiffness or rigidity required. On top of the saddle-shank is the cross-block G, made in trough shape or with raised edges, practically in the form of a V-block. The edges of this block form the bearing-points for the spring at each side.

In order to attach the spring to the block, four dowel-pins $g$ are secured in the block and holes are made in the leaves to fit these pins loosely. Above the block G is placed the convex clamping-block H, perforated to fit over the dowel-pins. The dowel-pins may be secured, if desired, in the clamp-block H instead of the block G. Screw-bolts J pass through the block G and are tapped into the clamping-block H, as shown in the drawings, or vice versa, if desired. The ends of the spring-leaves at the proper places are cut away to accommodate the passage of these bolts. By tightening the bolts J the inner ends of the spring-plates are depressed into the V-groove and their outer ends elevated to any degree desired, or until they are completely elevated, if desired, as shown in Fig. 4. The tension of the spring will be increased in proportion as the clamping-block H is brought down toward the block G—that is to say, the spring will be stiffest when its outer ends are elevated to the highest point and will be weakest when said outer ends are lowered to the horizontal position or nearly thereto. This affords a ready and simple means of changing at will the tension of the spring to suit the condition of the road and the weight of the rider, or both. To the outer ends of the spring at each end are pivotally connected the links E E', which links are pivotally or loosely connected to the frame at the lower extensions D' thereof. It will now be seen that the saddle-seat and the frame, even when depressed to their fullest extent by the weight of the rider, will be free to swing backward and forward on the long links E E' to a considerable extent. It will be noticed that the links E and E' at each end are inclined in a downwardly direction, converging toward each other, and also that the two links at each end are arranged relatively to each other in directions converging upwardly toward the longitudinal center of the spring, and that all the joints between the links and the frame and spring are of such a nature as to permit considerable freedom of movement in several directions or flexibility to the structure. By inclining the links at one end toward those at the other the saddle is thus permitted to move backward and forward a considerable distance, while the frame at the point where the links are joined to it has a comparatively-limited movement, and by inclining the two links at each end toward each other, as stated, a slight sidewise rocking freedom is permitted the saddle, which greatly eases the labor attending the working of the pedals. The construction shown, so far as these features are concerned, may be greatly modified and changed; but I have found by actual use that a seat made in accordance with the drawings works well.

In order that the saddle when empty and unoccupied by the rider shall be held against rocking forward and backward and to steady the same while the rider is mounting to place, I employ a device adapted to secure this result, and this device may consist of the leather strap K, applied to the under side of the saddle and led from the front part of the saddle under a loop $k$, and thence up to the rear part of the saddle. When the rider is in the saddle and his weight depresses the same, this strap will be perfectly loose and not interfere with the operation of the links in the movement of the parts; but when there is no weight in the saddle and it is therefore raised to its highest position this strap is tightened sufficiently to steady the saddle, as above described. This strap should be regulable as to length, so as to enable the tension to be made greater or less, as required. A buckle $k'$ will serve this purpose. The ends of the corresponding bars D at each side of the saddle are united by cross-bars $d^3$. It will be noticed that the spring is located between the sides of the saddle-frame and close up under the leather top, to the curvature of which it approximately conforms. This enables the making of the saddle in compact form and the putting of the working parts where they are most serviceable in the performance of their functions.

I claim—

1. The saddle for bicycles, consisting of a seat and a rigid frame therefor, combined with a spring and swinging link connections between the frame and the spring, adapted to allow movement in several directions, whereby the saddle may have a backward and forward swinging and a sidewise-rocking motion upon the spring when the rider is on the seat, substantially as specified.

2. The combination of a spring secured to the saddle-shank, a rigid framework carrying the saddle, and links E E', adapted to swing in several directions and connecting the framework with the spring, substantially as specified.

3. The saddle having the frame composed of bars having the downwardly-extending pieces D', in combination with the leaf-springs F and the links E E', substantially as specified.

4. The spring for bicycle-saddles, consisting of the leaves F F, combined with the block G, mounted on the saddle-shank, the block H, and screws J, substantially as specified.

5. The spring for bicycle-saddles, consisting of the leaves F F, mounted on the block G between said block and the clamping-block H, substantially as specified.

6. The frame consisting of the bars D D, having the extensions D' and the rods $d^2$, in combination with the spring and the links E E', substantially as specified.

7. The saddle-shank for bicycles, having an aperture to receive the saddle-post concaved to fit a convex block, said block $b^2$ and the set-screws combined together as a means for adjusting the saddle upon the saddle-post into different positions, substantially as specified.

8. The saddle for bicycles, consisting of a saddle-seat and its frame, a spring, and links from the frame to the spring when said links are arranged in such manner that their connection to the spring is nearer to the longitudinal center of the saddle than their connection to the frame, substantially as specified.

9. The spring for bicycle-saddles, composed of the leaves F F, the block G, and the clamping-block H, means for securing the blocks G and H together, and the dowel-pins $g$, passing loosely through holes in the springs, substantially as specified.

10. The combination, with the backwardly and forwardly swinging seat, of a spring supporting said seat, a frame and links connecting said seat and spring, and a strap opposing said spring, the strap being distended by the action of the spring when the rider is not upon the seat and loosened by the depression of the spring when the rider is on the seat, substantially as specified.

11. The combination, in a bicycle, of a seat having a backward and forward swinging motion when occupied, a spring upon which the seat is supported, a frame, and links connecting the seat and spring, and a fastening for rendering the seat rigid when it is not occupied, substantially as specified.

12. The saddle for bicycles, consisting of a saddle-seat and its frame, a spring, and links E and E' from the frame to the spring, said links being arranged to converge downwardly toward each other, substantially as and for the purpose set forth.

13. The saddle for bicycles, consisting of a saddle and its frame, a spring, and two links E and two links E', loosely joined to the spring and frame and arranged in converging lines, as set forth, whereby the saddle is permitted both a backward and forward motion and a sidewise-rocking motion, substantially as described.

14. The saddle having a frame composed of the pairs of bars D D', each pair fastened together at $d$ and suitably joined at the ends, and rods $d^2$, in combination with the spring and links, substantially as specified.

15. The combination of a saddle, a rigid frame supporting the saddle, a spring mounted upon the seat-post of the bicycle between the sides of the frame and close under the leather top, and swinging and converging links uniting the frame and the springs, substantially as specified.

16. In a bicycle, a saddle, and its frame suspended from a spring by supports, essentially such as described, said supports being adapted to allow a backward and forward vibration compounded with an endwise dropping of the saddle relative to the machine when in use, in combination with said spring and supports, substantially as specified.

17. A sidewise-rocking saddle suspended upon links located at its sides, the links upon each side of the saddle being inclined in an upward direction toward the opposite side, substantially as specified.

JOHN ANDREW STENBERG.

Witnesses:
EDW. S. EVARTS,
EMMA HACK.